May 14, 1940. W. W. HARGRETT 2,200,670
FISHING PLUG
Filed Jan. 7, 1939
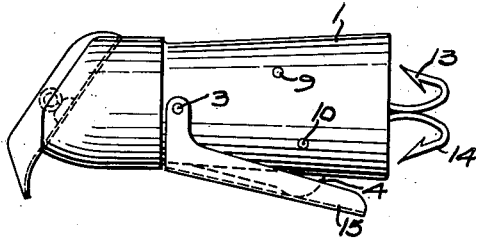
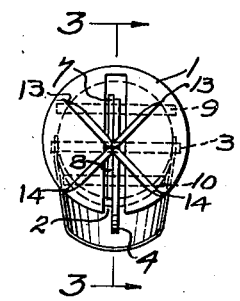
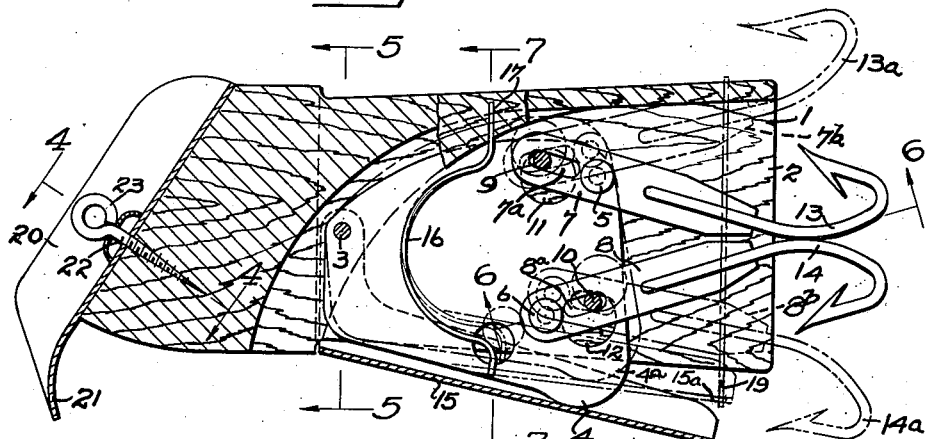
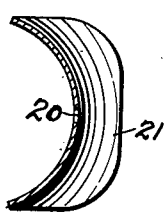
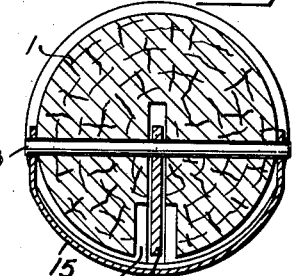
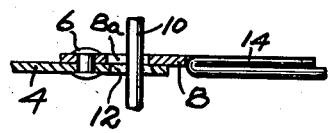
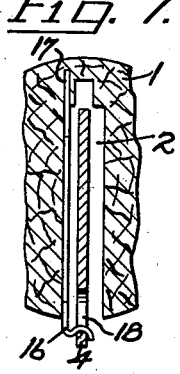
INVENTOR.
Wilson W. Hargrett
BY
Craw F Badwin
ATTORNEY.

Patented May 14, 1940

2,200,670

UNITED STATES PATENT OFFICE 2,200,670

FISHING PLUG

Wilson W. Hargrett, Wyandotte, Mich.

Application January 7, 1939, Serial No. 249,772

5 Claims. (Cl. 43—36)

This invention relates to improvements in fishing plugs. It is an object of the invention to provide a fishing plug having hooks extending rearwardly therefrom, which are outwardly movable, and to so mount the hooks that they are normally positioned adjacent the longitudinal axis of the plug and lie behind the latter as the plug travels through the water. Thus I aim, among other things, to provide a fishing plug wherein the hooks are normally shielded by the plug and are therefore less liable to become entangled in weeds.

Another object of the invention is to provide such a fishing plug wherein a trigger plate is provided so that when the latter is pressed towards the plug, as would occur if a fish tried to bite the plug, the hooks swing outward and project laterally beyond the plug.

A further object of the invention is to provide such a plug wherein means are provided for normally holding the trigger plate in such position that the hooks lie adjacent the longitudinal axis of the plug and are protected thereby, so that if the trigger plate strikes an obstruction in the water which momentarily causes the hooks to move outwardly they reassume their normal positions as soon as the pressure against the trigger plate is relinquished by the obstruction.

Yet another object of the invention is to provide a fishing plug with a cheap and simple form of action plate by which the plug is moved along a zigzag course as it travels through the water.

Having thus briefly stated some of the major objects and advantages of the invention I will now proceed to describe a preferred embodiment thereof with the aid of the accompanying drawing, in which:

Figure 1 illustrates a side elevation of the invention showing the hooks and the trigger plate in their normal positions, and Figure 2 is an end view thereof.

Figure 3 is an enlarged section on the line 3—3 of Figure 2 wherein the hooks are also indicated in their outstretched position.

Figures 4, 5, 6 and 7 are sections on the lines 4—4, 5—5, 6—6 and 7—7 respectively of Figure 3.

Referring to the drawing, 1 designates a plug which is preferably circular in cross section and is longitudinally slotted at 2 from its rear extremity and substantially centrally of its width. Mounted in the plug 1 and extending across the slot 2 is a pin 3 on which an actuating member 4 is pivoted. Pivotally mounted on the member 4 as by rivets 5 and 6 are arms 7 and 8 respectively.

9 and 10 denote two other pivot pins which are mounted in the plug 1 and extend across the slot 2 parallel with the pin 3. The pin 9 extends through a clearance opening 11 formed through the member 4 and also through a slot 7a in the arm 7; similarly the pin 10 extends through a clearance opening 12 through the member 4 and also through a slot 8a in the arm 8. Extending from each arm 7 and 8 and integral with them are hooks 13 and 14 respectively which project behind the plug 1.

Mounted upon the extremities of the pin 3 exteriorly of the plug 1 is a trigger plate 15 the cross sectional form of which conforms substantially to that portion of the plug periphery adjacent which it lies. The inner face of the trigger plate 15 rests against the outer edge face of the actuating member 4 and the latter is normally retained in its outward position by a suitable spring 16 which retains the rear edge of the trigger plate in contact with the adjacent portion of the plug periphery. In the present instance the spring 16 is shown with one extremity extending into an aperture 17 formed in the base of the slot 2, bowed intermediately of its length, and with its opposite extremity flexed to project through an aperture 18 formed through the member 4 and in engagement with the outer margin of said aperture.

From the foregoing it will be apparent that the spring 16 normally retains the member 4 in its position shown in Figure 1. However when the trigger plate 15 is moved pivotally towards the plug at its outer extremity to the position indicated at 15a, as would occur if a fish bit the plug and trigger plate, the member 4 is moved to its position indicated at 4a, and the arms 7 and 8 are moved about the pins 9 and 10 to their positions 7b and 8b respectively, whereupon the hooks 13 and 14 assume their positions 13a and 14a. As soon as the trigger plate is released the spring 16 causes the actuating member 4 to reassume its normal position thereby forcing the trigger plate to its initial position.

If it is desired to hold the hooks in their outstretched positions 13a and 14a this may be easily done by placing a rubber band, indicated at 19 in Figure 3, around the plug 1 and the trigger plate 15.

In order to move the plug 1 through the water along a zigzag path so that it will attract fish the front extremity of the plug is inclined and of transversely concave form to receive a similarly curved action plate 20 one extremity of which terminates in a rearwardly flexed tongue 21 that projects laterally beyond the plug. The action plate 20 is held in position by a screw 22 which engages the plug and terminates at its outer extremity in an eye 23 or other suitable means for attachment of a line (not shown) thereto.

While in the foregoing a preferred embodiment of the invention has been described and shown it is understood that the construction is susceptible to such alterations and modifications as fall within the scope of the appended claims.

What I claim as my invention and desire to secure by Letters Patent is:

1. An arrangement of the character described comprising a plug slotted from one extremity, an actuating member pivoted on said plug and disposed in said slot, arms pivoted on said member, hooks extending from said arms, pins mounted in said plug one extending through each arm and through said member, a trigger plate pivoted on said plug, and a spring tending to hold said member and trigger plate in their normal positions.

2. An arrangement of the character described comprising a plug having its rear extremity longitudinally slotted, hooks normally positioned rearwardly of the plug within an imaginary line representing the periphery of the plug rearwardly produced, arms in said slot carrying said hooks, said arms being pivoted on said plug, a trigger plate pivoted on said plug, means connected to said arms adapted to be moved by movement of the pivot plate to swing the hooks outwardly beyond said imaginary line, and means tending to retain the hooks in their normal positions.

3. An arrangement of the character described comprising a plug slotted longitudinally from its rear extremity, means mounted at the front extremity of the plug for attachment to a line whereby the plug may be drawn through the water, a trigger plate pivoted on the plug, an actuating member in the slot pivoted on the plug, said member being adapted to be moved by said trigger plate, arms in the slot pivoted on the trigger plate, separate means carried by the plug on which each arm is pivoted, hooks secured to the arms and projecting rearwardly of the plug, and means normally retaining the plug within an imaginary line representing the periphery of the plug produced rearwardly whereby the hooks are projected by the plug while passing through the water, said hooks being adapted to be moved laterally outwardly beyond said imaginary line upon movement of the triger plate.

4. An arrangement of the character described comprising a slotted plug, an actuating member pivoted in the slot, arms pivoted on the member, hooks secured to said arms, separate means carried by the plug controlling the path of movement of the arms upon pivotal movement of the actuating member, a trigger plate pivoted on the plug adapted to move said member pivotally and cause outward movement of the hooks, and a spring tending to hold the free end of the trigger plate spaced from the plug.

5. An arrangement of the character described comprising a plug slotted longitudinally from its rear extremity, an actuating member pivoted on the plug and located in said slot, arms in the slot pivoted on said member, separate means projecting from the plug on which each arm is pivoted, hooks fixed on the arms extending rearwardly of the plug, a trigger plate pivoted on the plug adapted to move the actuating member, and a spring mounted in the slot adapted to normally retain the free extremity of the plate spaced from the plug and the hooks within an imaginary line representing the plug periphery rearwardly produced.

WILSON W. HARGRETT.